United States Patent [19]
Diemer et al.

[11] Patent Number: 5,882,124
[45] Date of Patent: Mar. 16, 1999

[54] NEEDLE BEARING

[75] Inventors: Karl Diemer, Idstein; Juraj Orgonik, Willich; Werner Kupietz, Bielefeld, all of Germany

[73] Assignee: The Torrington Company, Torrington, Conn.

[21] Appl. No.: 977,703

[22] Filed: Nov. 25, 1997

[51] Int. Cl.$^6$ .................................................. F16C 33/46
[52] U.S. Cl. ........................ 384/570; 384/569; 384/572; 384/577; 384/906
[58] Field of Search .................................. 384/569, 570, 384/572, 575, 576, 577, 906

[56] References Cited

U.S. PATENT DOCUMENTS 1,928,823  10/1933  Young .
3,251,118   5/1966  Pitner .
5,152,615  10/1992  Bauer et al. .............................. 384/575

Primary Examiner—Lenard A. Footland
Attorney, Agent, or Firm—John C. Bigler

[57] ABSTRACT

A needle bearing has an outer sleeve and a needle cage. The sleeve is punched out of a flat sheet of metal and is coiled to be cylindrical. It has a window, and the needle cage has a corresponding window. The needle cage is guided circumferentially and axially inside the sleeve in such a way that the windows are aligned relative to one another so that an actuating member can pass radially through both windows. The needle bearing may be used, for example, for guiding a pressure pin for a braking mechanism of a vehicle.

20 Claims, 6 Drawing Sheets

NEEDLE BEARING

BACKGROUND OF THE INVENTION

This invention relates generally to a needle bearing having a window in a sleeve that provides an outer raceway and, more particularly, to such a needle bearing having a corresponding window in a needle cage inside the sleeve.

The windows in the sleeve and the needle cage allow another component to engage in the needle bearing in the radial direction, for example in order to rotate the needle cage about its axis or for the engagement of the other component in a further construction element arranged inside the needle bearing. This may involve a shaft which is designed, for example, to be non-circular in cross section and which, when rotated inside the needle bearing, displaces the additional component radially relative to the needle bearing.

Such a needle bearing is known from practical application. It has a deep-drawn outer sleeve which may be hardened and which has, in particular, a round or oval window. The needle cage has a corresponding window, the needle cage naturally not being fitted with a full set of rollers, but having no rollers in the region of the window. In this case, the needle cage with the rollers is inserted into the sleeve which is subsequently flanged over the needle cage at its ends in order to form a commercial needle bearing. The invention is based on the object of designing such a needle bearing to be simpler in construction in order to simplify the manufacture and assembly of the needle bearing, but especially to prevent closure of the sleeve window as a result of rotation of the cage. Accordingly, a suitable alternative is provided including features more fully disclosed hereinafter.

SUMMARY OF THE INVENTION

In one aspect of the invention, this is accomplished by providing a needle bearing comprising a sleeve and a needle cage arranged inside the sleeve. The sleeve is coiled into a cylindrical shape from a punched-out flat sheet of metal and has an axial slot at the joint, which slot is extended between the ends of the sleeve to form a window in the sleeve. The needle cage has a window between its axial ends corresponding to the window in the sleeve. The needle cage is guided circumferentially in relation to the window of the sleeve.

The manufacture of the sleeve may be simplified since the sleeve consists of a flat sheet of metal coiled into a cylindrical shape. As a result of the axial slot present at the joint, the sleeve can be fitted into bearing bores with a comparatively large tolerance because it is radially flexible. The needle cage is fastened and guided, in the region of its window, in the circumferential direction in relation to the sleeve, e.g. by at least one holding strap projecting radially into the window of the sleeve, so that the two windows of the sleeve and of the needle cage can rotate relative to one another in the circumferential direction to the extent that it is always possible for an additional component to pass through the two windows.

The needle bearing according to the invention can be mounted, in particular, on the actuating shaft of a braking mechanism of a vehicle, in particular the handbrake mechanism of a motor vehicle. In this case, the actuating shaft only needs to be rotated through a specific small angle in order, during brake actuation, for example when applying a parking brake or handbrake, to adjust an actuating member projecting through the two windows of the needle bearing for the brake to pull the brake tight.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
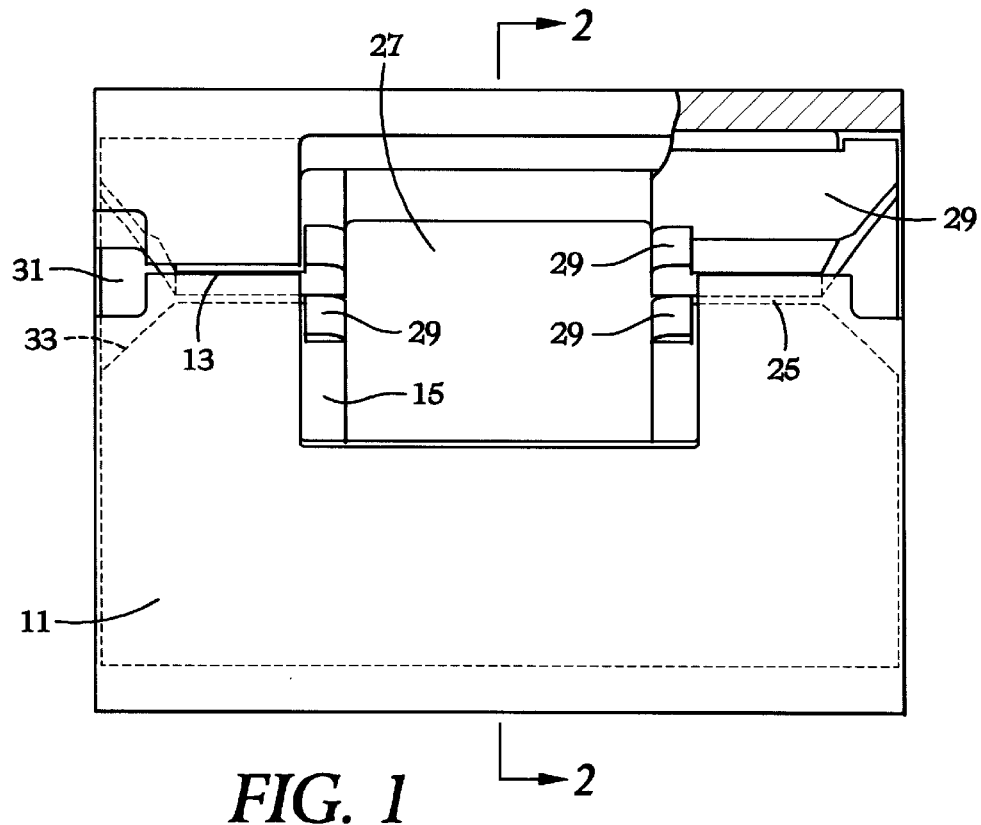
FIG. 1 shows a side view, partially in section, of the needle bearing according to the invention.
Figure 2:
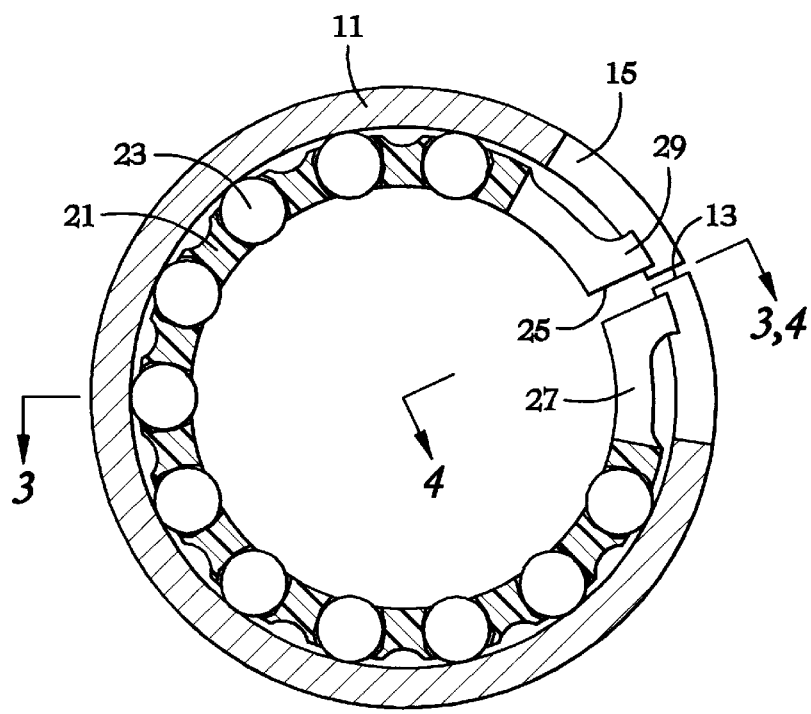
FIG. 2 is a cross section through the needle bearing along the line 2—2 of FIG. 1.
Figure 3:
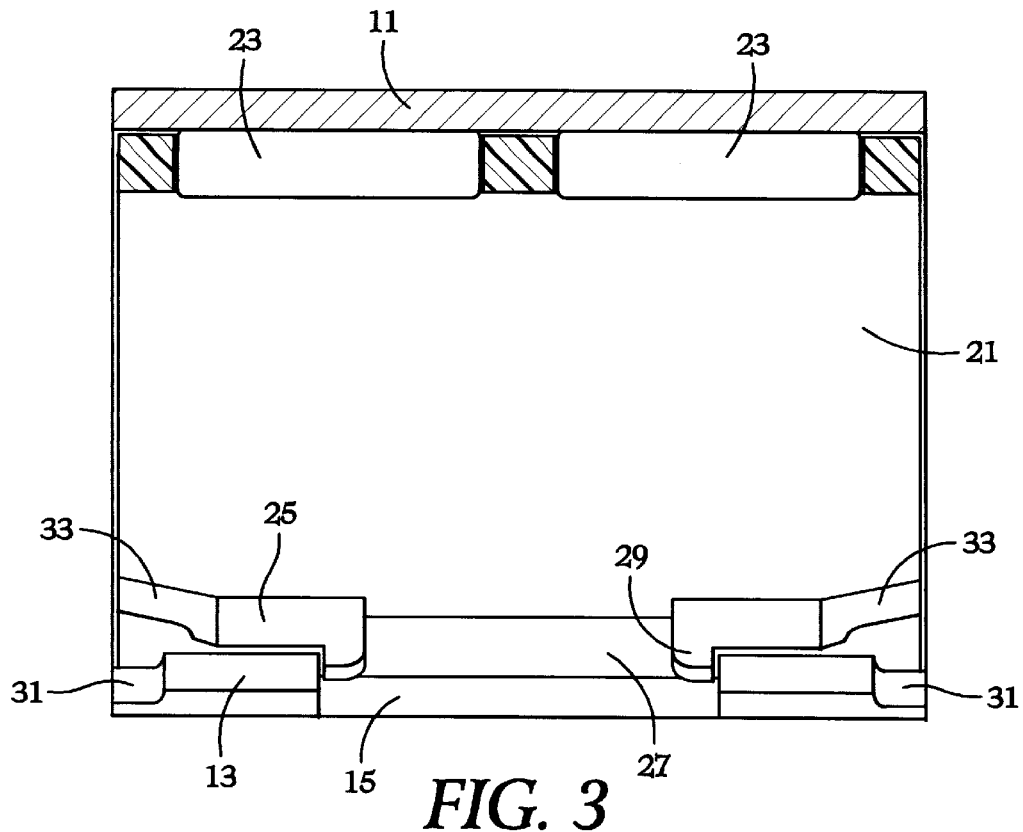
FIG. 3 is a section through the needle bearing along the line 3—3 of FIG. 2.
Figure 4:
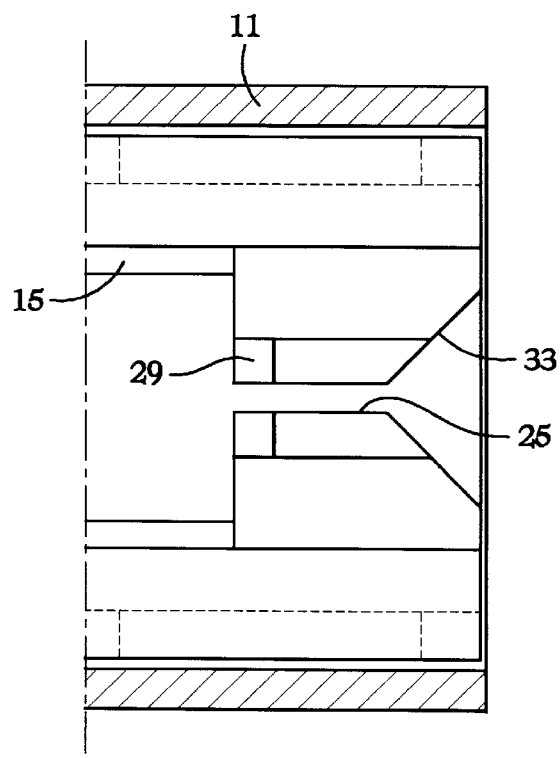
FIG. 4 is a sectional view of the needle bearing in the direction of the arrow 4 in FIG. 2, only half the needle bearing being shown.

According to FIGS. 1 through 3, the needle bearing has an outer sleeve 11 which was punched out of a flat sheet of metal and coiled into a cylindrical shape. Thus resulting at the circumferential ends of the coiled sheet of metal is a joint which forms axial slot 13 extending over the entire axial length of sleeve 11. Between the axial ends of sleeve 11, slot 13 is extended by window 15 which is punched out through the sheet of metal before the latter is coiled.

Needle cage 21, preferably made of injection-molded plastic, is arranged in sleeve 11. Needle cage 21 is fitted with circumferential rows of individual needle rollers 23 arranged axially one behind the other. Only one row or more than two rows of needle rollers 23 may also be provided. Needle cage 21 has an axial slot 25 extending in its axial direction. Between its ends and in the region of its slot 25, the needle cage 21 has a radially extending window 27 which approximately corresponds in its size and its dimensions to window 15 of the sleeve and is aligned with the latter in the circumferential direction and in the axial direction.

In the region of its window 27, needle cage 21 has at least one holding strap 29, preferably four such holding straps 29, projecting radially outward, as can be seen in FIG. 1. With their axially outer surface, holding straps 29 touch the axially inner edge of window 15 of sleeve 11, so that needle cage 21 is guided in the circumferential direction relative to sleeve 11 by means of holding straps 29. By the holding straps 29 contacting the circumferential ends of window 15 of sleeve 11, the rotation of needle cage 21 relative to sleeve 11 is limited in the circumferential direction.

At the same time, by their axially outer surfaces resting against the axially inner surfaces of window 15 of sleeve 11, the holding straps 29 serve to prevent any axial movement of cage 21 inside sleeve 11, that is to say hold needle cage 21 axially in sleeve 11. Flanging the ends of sleeve 11 over needle cage 21 or another type of fastening of these parts is thus not required. As shown in FIGS. 1 through 3, needle cage 21 thus bears at least one holding strap 29 at each of the two axial ends of its window 27, in particular, however, one holding strap 29 on each side of its slot 25, that is to say a total of four holding straps 29.

Owing to the arrangement of holding straps 29, the window 27 of needle cage 21 is shorter in the axial direction than window 15 of sleeve 11. In particular, window 27 of needle cage 21 is shorter than window 15 of sleeve 11 by the joint axial length of the two holding straps 29 located one behind the other in the axial direction. Nevertheless, as shown in FIGS. 1 through 3, window 27 of needle cage 21 is aligned with the window 15 of sleeve 11 axially and in the circumferential direction such that an additional component can pass through both windows 15 and 27 in the radial direction.

Figure 6:
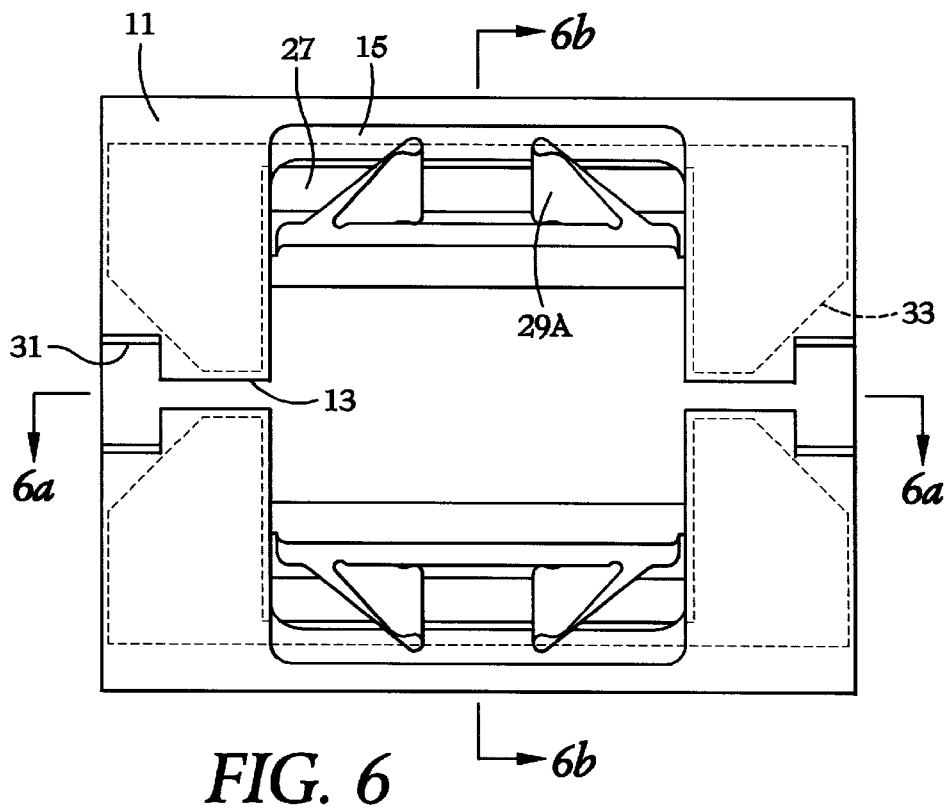
FIG. 6 is a side view of a variant of the needle bearing.
Figure 6A:
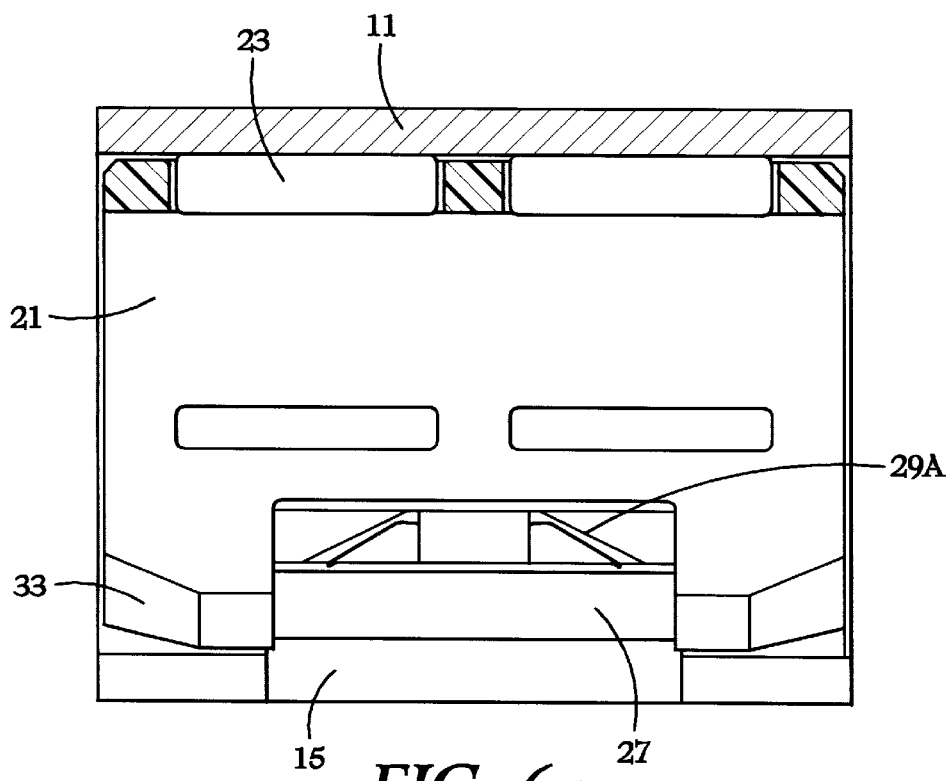
FIG. 6a is a section along the line A—A of FIG. 6.
Figure 6B:
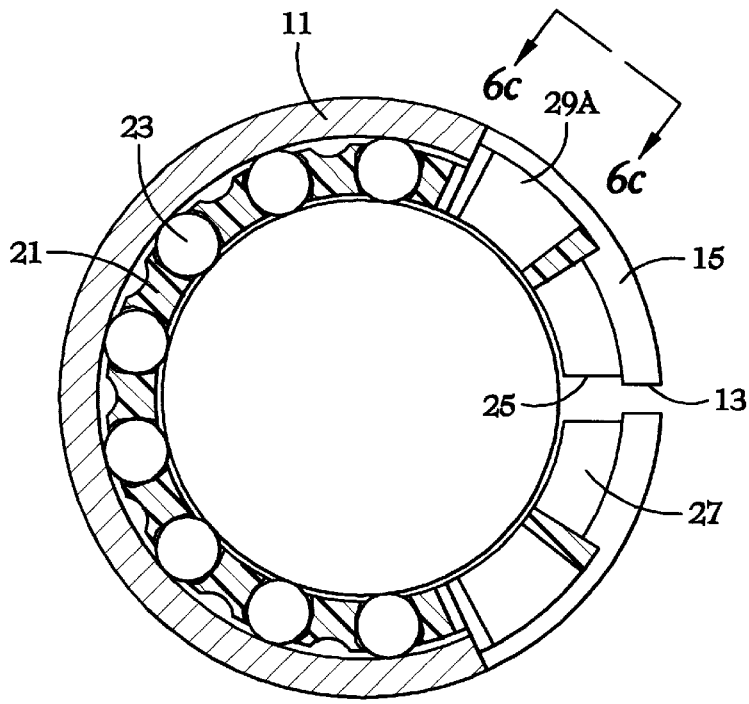
FIG. 6b is a section along the line B—B of FIG. 6.
Figure 6C:
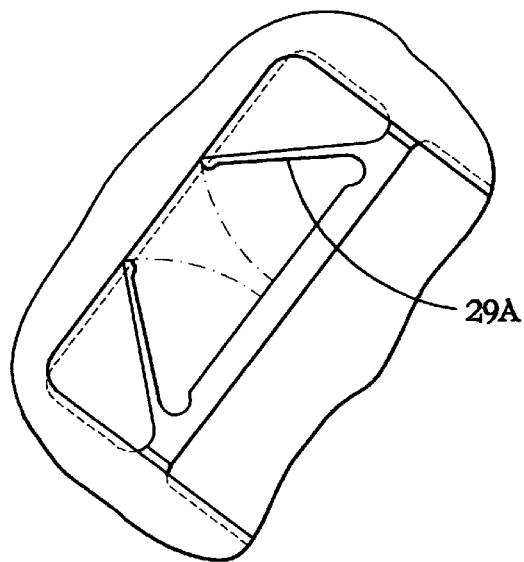
FIG. 6c is a partial view in the direction of the arrow C of FIG. 6b.

In the variant shown in FIGS. 6 through 6c, holding straps 29A are designed with sprung tongues. This has the additional effect that needle cage 21 is in a defined position relative to window 15 of needle sleeve 11 in the unactuated state, that is to say the non-rotated state relative to needle sleeve 11.

Windows 15 and 27 of sleeve 11 and of bearing cage 21 are preferably rectangular in contour in order to ensure good guiding of needle cage 21 inside sleeve 11 by means of the holding straps 29 and/or 29A. In this case, window 27 of needle cage 21 can have virtually the same angular length in the circumferential direction as window 15 of sleeve 11 (see FIG. 2). The entire circumferential length of the two windows 15 and 27 can thus be used for the passage of an additional actuating member, thus minimizing any weakening of sleeve 11 and/or of needle cage 21 by windows 15, 27 provided therein and any weakening of the overall needle bearing by the lack of needle rollers 23 in the region of window 27 of needle cage 21.

To assemble the needle bearing, needle cage 21 is squeezed together radially, which is easily possible due to slot 25, and is inserted axially into sleeve 11, where it snaps apart and causes the holding straps 29 and/or 29A to engage in window 15 of sleeve 11.

As is shown in particular in FIGS. 1 and 3, sleeve 11 has recesses 31 at its axial ends. In a similar way, needle cage 21 has, at its axial ends, recesses 33 which are aligned in the radial direction with recesses 31 of sleeve 11. These recesses 31 and 33 serve as pilot recesses for guiding and alignment during assembly of the bearing and during the arrangement of the bearing in its operational environment. Recesses 31 and 33 make this possible because they are each arranged at the ends of slots 13 and 25 of sleeve 11 and needle cage 21. In addition to their pilot function during assembly, recesses 31 of sleeve 11 also make it possible for a securement against rotation to be mounted on the housing surrounding sleeve 11, e.g. the provision of a caulked arrangement, a pin or the like which engages in recesses 31 as a securement against rotation.

The two rows of needle rollers 23 are free from needle rollers 23 in the circumferential direction in the region of window 25 of needle cage 21, that is to say they each have an incomplete set of rollers determined by the circumferential extent of window 25.

Figure 7:
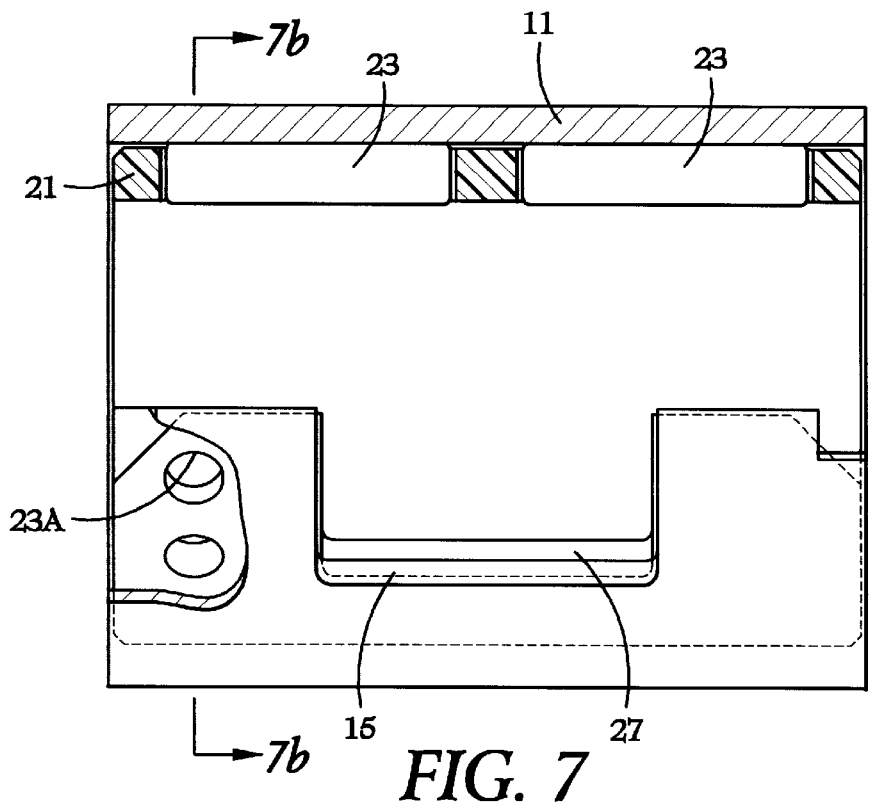
FIG. 7 is a side view, partially in section, of a modified embodiment of the needle bearing according to the invention.
Figure 7A:
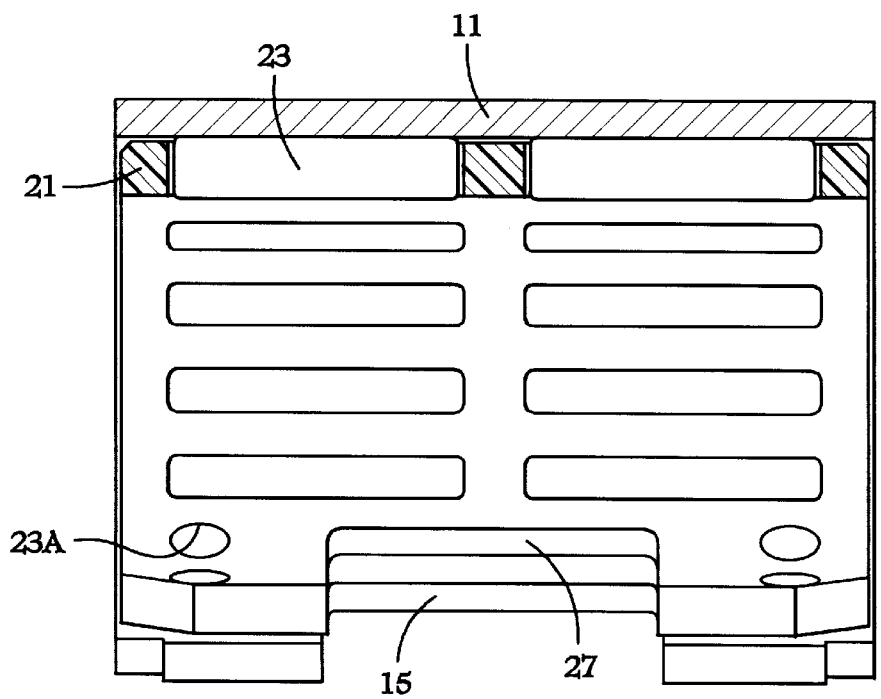
FIG. 7a is a section along the line A—A of FIG. 7b.

FIG. 7 shows a modified embodiment of the needle bearing. If window 15 of needle sleeve 11 and window 27 of needle cage 21 require such a large circumferential angular opening that centering of needle cage 21 is no longer ensured by the circumferential angular region which remains due to the reduced number of needle rollers 23, that is to say if the circumferential angular region of needle rollers 23 is, for example, approximately equal to or less than 180 degrees, additional centering elements in the form of bearing balls 23A can be mounted on needle cage 21 axially next to its window 27. These then ensure centering of needle cage 21 inside needle sleeve 11. Instead of balls 23A mounted rotatably in needle cage 21, elevations, knobs or the like (not illustrated) may also be provided on bearing cage 21.

Figure 5:
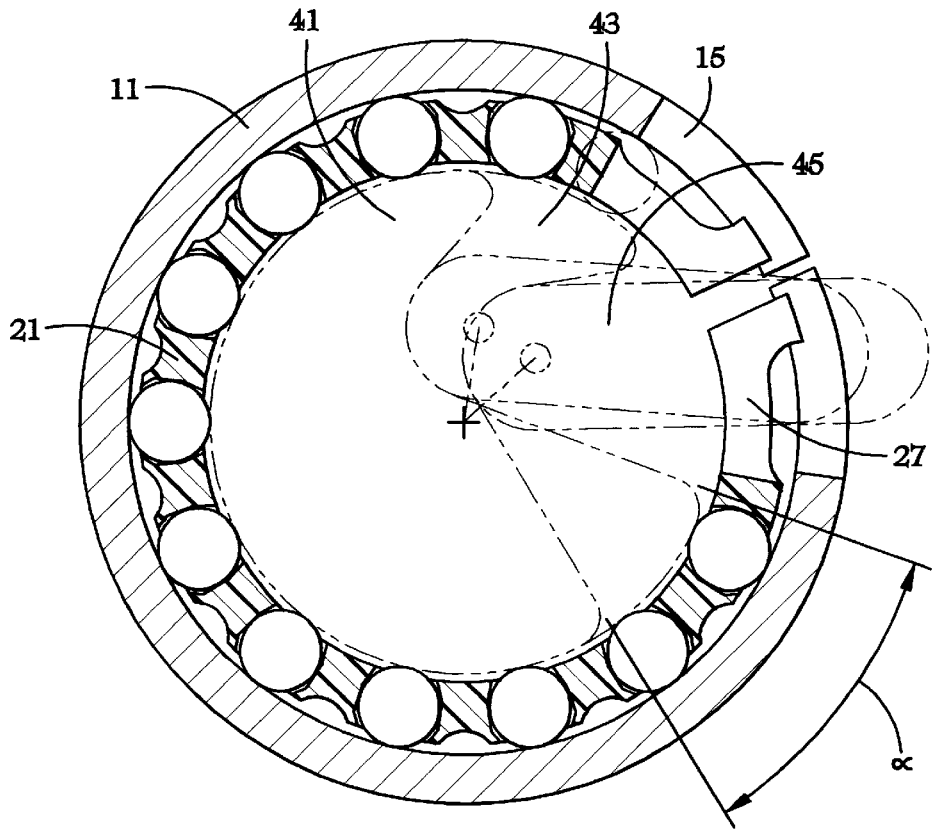
FIG. 5 is a sectional view of the needle bearing according to FIG. 2 with an inner actuating shaft and an additional component actuated by the latter in the form of a pressure pin.
Figure 7B:
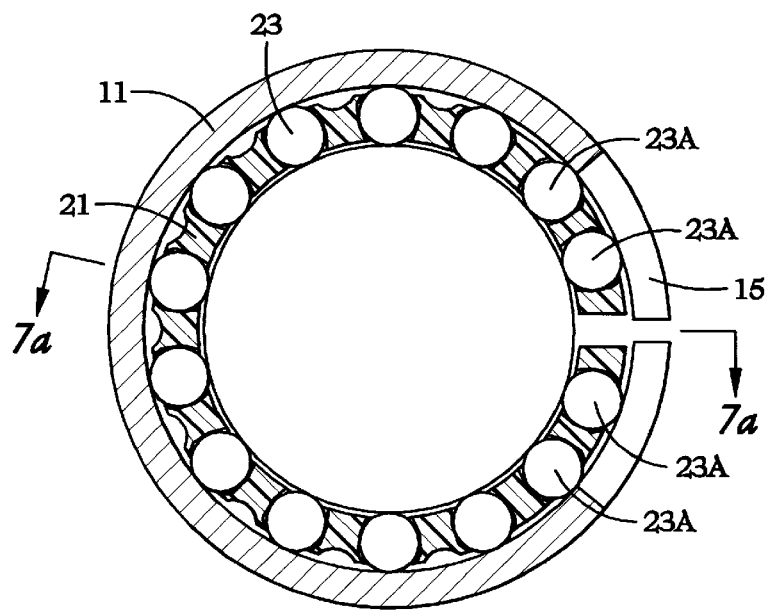
FIG. 7b is a section along the line B—B of FIG. 7.

FIG. 5 shows an application of the needle bearing. In addition to the illustration in FIG. 2, in FIG. 5 actuating shaft 41 on which the needle cage 21 is mounted is arranged inside needle cage 21. Actuating shaft 41 has a cutout 43 which is shown by dot/dash lines in FIG. 5. A pressure pin 45 which is likewise shown by dot/dash lines in FIG. 5 engages in the radial direction in the cutout 43. FIG. 5 depicts two rotational settings of actuating shaft 41 which, during its rotation, displaces pressure pin 45 in the radial direction, such that two settings are also indicated for pressure pin 45. Moreover, FIG. 5 shows the maximum rotational angle or actuating angle b for actuating shaft 41 which bounds the maximum radial displacement of pressure pin 45.

When the needle bearing is used for a braking mechanism of a vehicle, in particular for the parking or handbrake mechanism of a motor vehicle, actuating shaft 41 is rotated, for example, by a lever (not shown), mounted at the end of the actuating shaft, by means of a cable pull from the handbrake lever of the vehicle. Owing to the cutout 43 on its circumference, the rotation of actuating shaft 41 is translated into a radial displacement of pressure pin 45 which acts with its radially outer end directly or indirectly on a brake disc of the vehicle. Since, in terms of its angle, only a limited rotation of the actuating shaft is required for this purpose, a small maximum actuating angle in the circumferential direction of, for example, 40° is sufficient.

A constructionally simple and inexpensive solution to the problems of the prior is provided by the design of the needle bearing with a slotted sleeve 11 and a slotted cage 21, each having windows 15 and 27 through which the pressure pin 45 passes radially.

Having described the invention, what is claimed is:

1. A needle bearing comprising a sleeve and a needle cage arranged inside the sleeve, wherein:
   the sleeve is coiled into a cylindrical shape from a punched-out flat sheet of metal and has an axial slot at the joint, which slot is extended by a window between the ends of the sleeve;
   the needle cage has a corresponding window between its axial ends corresponding to the window in the sleeve; and
   the needle cage is guided circumferentially in relation to the window of the sleeve.

2. The needle bearing as claimed in claim 1, wherein the needle cage has a longitudinal slot which is extended by the corresponding window between the ends of the cage.

3. The needle bearing as claimed in claim 1, wherein, to guide the needle cage, at least one holding strap projects from the needle cage radially outward into the window of the sleeve.

4. The needle bearing as claimed in claim 1, wherein the window of the sleeve and the corresponding window of the needle cage are rectangular.

5. The needle bearing as claimed in claim 2, wherein the needle cage bears at least one holding strap at each of the two axial ends of its window, in particular one holding strap on each side of the slot.

6. The needle bearing as claimed in claim 1, wherein the window of the needle cage is shorter in the axial direction by about the whole axial length of the holding straps than the window of the sleeve.

7. The needle bearing as claimed in claim 1, wherein the holding straps are designed with sprung tongues.

8. The needle bearing as claimed in claim 1, wherein the window of the needle cage has approximately the same angular length in the circumferential direction as the window of the sleeve.

9. The needle bearing as claimed in claim 1, wherein the needle cage is designed with two rows of needle rollers located axially one behind the other, and wherein the region of its window is free from needle rollers.

10. The needle bearing as claimed in claim 1, wherein centering elements are mounted on the needle cage in addition to the needle rollers.

11. The needle bearing as claimed in claim 1, wherein the needle cage is made of plastic.

12. The needle bearing as claimed in claim 1, wherein pilot recesses are provided at the axial ends of at least one of the sleeve and the needle cage.

13. The needle bearing as claimed in claim 1, wherein the pilot recesses are each arranged on the slots of the sleeve and of the needle cage and are aligned radially relative to one another.

14. The needle bearing as claimed in claim 1, further comprising an actuating shaft of a braking mechanism of a vehicle, in particular the handbrake mechanism of a motor vehicle.

15. The needle bearing as claimed in claim 14, wherein the actuating shaft is arranged inside the needle cage, and a pressure pin arranged between the actuating shaft and a brake disc projects through the window of the sleeve and of the needle cage.

16. The needle bearing as claimed in claim 15, wherein the actuating shaft is of such a shape in cross section that, when the actuating shaft rotates, the pressure pin can be displaced radially back and forth in its axial direction in the windows of the sleeve and of the needle cage.

17. A needle bearing comprising a sleeve and a needle cage arranged inside the sleeve, wherein:

the sleeve has a window;

the needle cage has a corresponding window between its axial ends corresponding to the window in the sleeve; and the needle cage has at least one holding strap projecting from the needle cage radially outward into the window of the sleeve to guide the needle cage circumferentially in relation to the window of the sleeve.

18. The needle bearing as claimed in claim 17, wherein the needle cage has a longitudinal slot which is extended by the corresponding window between the ends of the cage.

19. The needle bearing as claimed in claim 17, wherein the needle cage bears at least one holding strap at each of the two axial ends of its window, in particular one holding strap on each side of the slot.

20. The needle bearing as claimed in claim 17, wherein pilot recesses are provided at the axial ends of at least one of the sleeve and the needle cage.

\* \* \* \* \*